US009504102B1

(12) United States Patent
Chen et al.

(10) Patent No.: US 9,504,102 B1
(45) Date of Patent: Nov. 22, 2016

(54) LIGHT EMITTING DEVICE DRIVER CIRCUIT AND CONTROL CIRCUIT AND CONTROL METHOD THEREOF

(71) Applicant: RICHTEK TECHNOLOGY CORPORATION, Zhubei, HsinChu (TW)

(72) Inventors: Pei-Yuan Chen, Zhubei (TW); Chien-Yang Chen, Taipei (TW); Leng-Nien Hsiu, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/068,572

(22) Filed: Mar. 12, 2016

Related U.S. Application Data

(60) Provisional application No. 62/154,853, filed on Apr. 30, 2015.

(51) Int. Cl.
*H05B 37/02* (2006.01)
*H05B 33/08* (2006.01)
*H02M 7/04* (2006.01)

(52) U.S. Cl.
CPC ........... *H05B 33/0812* (2013.01); *H02M 7/04* (2013.01)

(58) Field of Classification Search
CPC .. H05B 37/02; H05B 33/08; H05B 33/0812; H05B 33/0815; H05B 33/0824; H05B 33/0845; H05B 33/0851; H05B 33/0882
USPC ............ 315/209 R, 224–226, 291, 307, 308, 315/312, 360
See application file for complete search history.

(56) References Cited

U.S. PATENT DOCUMENTS 8,680,788 B2 * 3/2014 Esaki ................. H05B 33/0848 315/209 R
9,101,008 B2 * 8/2015 Sumitani ............ H05B 33/0815

* cited by examiner

*Primary Examiner* — Jimmy Vu
(74) *Attorney, Agent, or Firm* — Tung & Associates

(57) ABSTRACT

The present invention provides a light emitting device driver circuit and a control circuit and a control method thereof. The light emitting device driver circuit includes a power stage circuit, a feedback circuit, and a control circuit. The control circuit includes a comparison circuit, a hysteresis control circuit, and a bleeder circuit. The control circuit generates an analog control signal according to a rectified dimmer signal and an output signal, for controlling the power stage circuit to regulate an output current, which is supplied to a light emitting device circuit to determine its brightness. When the analog control signal decreases to a predetermined hysteresis low level, the light emitting device driver circuit operates in a cut-off mode wherein the bleeder circuit consumes a bleeder current so as to maintain the output current at a zero current, for keeping the light emitting device circuit OFF.

15 Claims, 6 Drawing Sheets

LIGHT EMITTING DEVICE DRIVER CIRCUIT AND CONTROL CIRCUIT AND CONTROL METHOD THEREOF

CROSS REFERENCE

The present application claims priority to U.S. 62/154,853, filed on Apr. 30, 2015.

BACKGROUND OF THE INVENTION

Field of Invention

The present invention relates to a light emitting device driver circuit and a control circuit and a control method thereof; particularly, it relates to such light emitting device driver circuit wherein a flicker problem is resolved, and a control circuit and a control method thereof.

Description of Related Art

FIG. 1A shows a schematic diagram of a conventional light emitting device power supply circuit 10. As shown in FIG. 1A, the light emitting device power supply circuit 10 converts an AC voltage VAC to an output voltage Vout and supplies an output current Iout to a light emitting diode (LED) circuit 20. The light emitting device power supply circuit 10 includes a TRIAC (TRI-electrode AC switch) dimmer circuit 11, a rectifier and filter circuit 13, and a light emitting device driver circuit 15. The TRIAC dimmer circuit 11 receives the AC voltage VAC (as indicated by a small sinusoidal signal waveform in the figure). When a phase of the AC voltage VAC exceeds a predetermined trigger phase, the TRIAC dimmer circuit 11 fires (i.e. is turned ON) to generate an AC dimmer voltage Vdim (as indicated by a small phase-cut sinusoidal signal waveform in the figure). The rectifier and filter circuit 13 rectifies and filters the AC dimmer voltage Vdim to generate an input voltage Vin (as indicated by a small DC signal waveform with ripples in the figure). FIGS. 1B and 1C show schematic waveforms of the AC voltage and AC dimmer voltages Vdim1 and Vdim2 with different trigger phases, wherein the AC voltage VAC is indicated by a dash line and the AC dimmer voltages Vdim1 and Vdim2 are indicated by solid lines. The rectifier and filter circuit 13 receives the AC dimmer voltage Vdim (e.g. Vdim1 or Vdim2), and rectifies the received AC dimmer voltage Vdim to generate a corresponding input voltage (e.g. Vin1 or Vin2), which is then provided to the light emitting device driver circuit 15. The light emitting device driver circuit 15 is coupled to the rectifier and filter circuit 13, for converting the input voltage Vin to the output voltage Vout, and provides the output current Tout to the LED circuit 20.

In the aforementioned circuit, the function of the TRIAC dimmer circuit 11 is to determine the trigger phase of the AC dimmer voltage Vdim, so as to adjust an average brightness of the LED circuit 20. Different trigger phases of the AC dimmer voltages Vdim1 and Vdim2 can result in different output currents Iout, whereby the brightness of the LED circuit 20 is different. For example, as shown in FIGS. 1B and 1C, wherein FIG. 1B shows the AC dimmer voltage Vdim1 with a lower (earlier) trigger phase, and FIG. 1C shows the AC dimmer voltage Vdim2 with a higher (later) trigger phase, which are rectified and filtered by the rectifier and filter circuit 13 to correspondingly generate a DC input voltage Vin1 with a higher level and a DC input voltage Vin2 with a lower level Vin2, the output current Iout corresponding to the input voltage Vin1 is relatively higher and the output current Iout corresponding to the input voltage Vin2 is relatively lower. As such, by adjusting the trigger phase, the brightness of the LED circuit 20 can be adjusted.

The aforementioned prior art has the following drawback. In the aforementioned prior art, the brightness of the LED circuit 20 is adjusted according to the input voltage Vin. In an ideal condition, the level of the output voltage Vout perfectly corresponds to the level of the input voltage Vin, and the level of the output current Iout perfectly corresponds to the level of the output voltage Vout; however, in a real condition, when the trigger phase exceeds (is later than) a certain angle, or when the TRIAC dimmer circuit 11 turns OFF the LED circuit 20, the leakage of the TRIAC dimmer circuit 11 will cause charges to be accumulated, i.e., the leakage will lead to an increase of the input voltage Vin and therefore an increase of the output voltage Vout, and to a certain extent a non-zero output current Iout is generated and the LED circuit 20 glimmers; after this discharge, the output voltage Vout drops to a lower level, and then increases again because of the leakage. The LED circuit 20 will flicker perceptibly because of the increase and decrease of the output voltage Vout.

In view of the foregoing problem, the present invention provides a light emitting device driver circuit and a control circuit and a control method thereof. The present invention generates a bleeder current in a predetermined trigger phase range by a hysteresis control method, such that the output current is kept zero, and the light emitting device circuit circuit is confirmed OFF, to solve the flicker problem.

SUMMARY OF THE INVENTION

In one perspective, the present invention provides a light emitting device driver circuit, which is configured to operably drive a light emitting device circuit according to a rectified dimmer signal, and determine a brightness of the light emitting device circuit, the light emitting device driver circuit comprising: a power stage circuit, which is configured to operably control at least one power switch therein to convert the rectified dimmer signal to an output signal according to an operation signal, wherein the output signal is for driving the light emitting device circuit; a feedback circuit, which is coupled to the power stage circuit, and configured to operably generate a feedback signal according to the rectified dimmer signal and the output signal; and a control circuit, which is coupled to the feedback circuit and the power stage circuit, and configured to operably generate the operation signal according to the feedback signal, wherein the control circuit includes: a first comparison circuit, which is coupled to the feedback circuit, and configured to operably generate an analog control (ACTL) signal according to the feedback signal; a hysteresis control circuit, which is coupled to the first comparison circuit, and configured to operably generate a bleeder signal and the operation signal according to the ACTL signal, a predetermined hysteresis low level and a predetermined hysteresis high level; and a bleeder circuit, which is coupled to the hysteresis control circuit, and configured to operably generate a bleeding current according to the bleeder signal; wherein the hysteresis control circuit operates in a cut-off mode when the ACTL signal decreases to the predetermined hysteresis low level, and in the cut-off mode, the hysteresis control circuit adjusts the bleeder signal to maintain the bleeding current at a predetermined bleeding level, so as to maintain an output current of the output signal at zero current, for keeping the light emitting device circuit OFF; wherein the hysteresis control circuit operates in a dimming mode when the ACTL signal increases to the predetermined hysteresis high level, and in the dimming mode, the hysteresis control circuit adjusts the bleeder signal to maintain the bleeding current at zero current, such that brightness of the light emitting device circuit is adaptively adjusted according to the rectified dimmer signal.

In one preferable embodiment, when the ACTL signal decreases to the predetermined hysteresis low level in the dimming mode, the corresponding output current is at a low boundary level, and the predetermined bleeding level is higher than the low boundary level.

In one preferable embodiment, the rectified dimmer signal is generated by a rectifier and filter circuit which converts an AC dimmer signal to the rectified dimmer signal, and the AC dimmer signal is generated by phase-cutting an AC signal by a phase-cut dimmer circuit.

In one preferable embodiment, the predetermined hysteresis low level is not higher than the predetermined hysteresis high level.

In one preferable embodiment, the hysteresis control circuit includes: a multiplexer (MUX), which is configured to operably select the predetermined hysteresis low level or the predetermined hysteresis high level as an MUX output signal of the MUX according to the bleeder signal; and a second comparison circuit, which is coupled to the first comparison circuit, and configured to operably compare the ACTL signal with the MUX output signal to generate the bleeder signal.

In one preferable embodiment, the hysteresis control circuit includes: a second comparison circuit, which is coupled to the first comparison circuit, and configured to operably compare the ACTL signal with the predetermined hysteresis low level, to generate a cut-off control signal; a third comparison circuit, which is coupled to the first comparison circuit, and configured to operably compare the ACTL signal with the predetermined hysteresis high level, to generate a dimmer control signal; an AND logic gate, which is coupled to the second comparison circuit and the third comparison circuit, and configured to operably perform AND logic operation between the cut-off control signal and the dimmer control signal, to generate a setting signal; a NOR logic gate, which is coupled to the second comparison circuit and the third comparison circuit, and configured to operably perform NOR logic operation between the cut-off control signal and the dimmer control signal, to generate a resetting signal; and a flip-flop circuit, which is coupled to the AND logic gate and the NOR logic gate, and configured to operably generate the bleeder signal according to the setting signal and the resetting signal.

From another perspective, the present invention provides a control method of a light emitting device driver circuit, comprising: operating at least one power switch in the light emitting device driver circuit to convert a rectified dimmer signal to an output signal according to an operation signal, wherein the output signal is for driving a light emitting device circuit and determining a brightness of the light emitting device circuit; generating a feedback signal according to the rectified dimmer signal and the output signal; generating an analog control (ACTL) signal according to the feedback signal; operating the light emitting device driver circuit in a cut-off mode when the ACTL signal decreases to the predetermined hysteresis low level, and adjusting a bleeder signal to maintain a bleeding current at a predetermined bleeding level, so as to maintain an output current of the output signal at a zero current for keeping the light emitting device circuit OFF; and operating the light emitting device driver circuit in a dimming mode when the ACTL signal increases to the predetermined hysteresis high level, and adjusting the bleeder signal to maintain the bleeding current at the zero current, so as to adaptively adjust the brightness of the light emitting device circuit according to the rectified dimmer signal.

In one preferable embodiment, when the ACTL signal decreases to the predetermined hysteresis low level in the dimming mode, the corresponding output current is at a low boundary level, and the predetermined bleeding level is higher than the low boundary level.

In one preferable embodiment, the rectified dimmer signal is generated by a rectifier and filter circuit which converts an AC dimmer signal to the rectified dimmer signal, and the AC dimmer signal is generated by phase-cutting an AC signal by a phase-cut dimmer circuit.

In one preferable embodiment, the predetermined hysteresis low level is not higher than the predetermined hysteresis high level.

In one preferable embodiment, the hysteresis control circuit includes: a multiplexer (MUX), which is configured to operably select the predetermined hysteresis low level or the predetermined hysteresis high level as an MUX output signal of the MUX according to the bleeder signal; and a second comparison circuit, which is coupled to the first comparison circuit, and configured to operably compare the ACTL signal with the MUX output signal to generate the bleeder signal.

In one preferable embodiment, the hysteresis control circuit includes: a second comparison circuit, which is coupled to the first comparison circuit, and configured to operably compare the ACTL signal with the predetermined hysteresis low level, to generate a cut-off control signal; a third comparison circuit, which is coupled to the first comparison circuit, and configured to operably compare the ACTL signal with the predetermined hysteresis high level, to generate a dimmer control signal; an AND logic gate, which is coupled to the second comparison circuit and the third comparison circuit, and configured to operably perform AND logic operation between the cut-off control signal and the dimmer control signal, to generate a setting signal; a NOR logic gate, which is coupled to the second comparison circuit and the third comparison circuit, and configured to operably perform NOR logic operation between the cut-off control signal and the dimmer control signal, to generate a resetting signal; and a flip-flop circuit, which is coupled to the AND logic gate and the NOR logic gate, and configured to operably generate the bleeder signal according to the setting signal and the resetting signal.

From another perspective, the present invention provides a control circuit of a light emitting device driver circuit, wherein the light emitting device driver circuit drives a light emitting device circuit according to a rectified dimmer signal to determine a brightness of the light emitting device circuit, wherein a phase-cut dimmer circuit phase-cuts an AC signal to generate an AC dimmer signal, and a rectifier and filter circuit converts the AC dimmer signal to the rectified dimmer signal, wherein the light emitting device driver circuit includes a power stage circuit, a feedback circuit, and the control circuit, wherein the power stage circuit is coupled to the rectifier and filter circuit, for operating at least one power switch therein to convert the rectified dimmer signal to an output signal according to an operation signal, wherein the output signal is for driving the light emitting device circuit, wherein the feedback circuit is coupled to the power stage circuit for generating a feedback signal according to the rectified dimmer signal and the output signal, wherein the control circuit is coupled to the feedback circuit and the power stage circuit, and configured to operably generate the operation signal according to the feedback signal, the control circuit comprising: a first comparison circuit, which is coupled to the feedback circuit, and configured to operably generate an analog control (ACTL) signal according to the feedback signal; a hysteresis control circuit, which is coupled to the first comparison circuit, and configured to operably generate a bleeder signal and the operation signal according to the ACTL signal, a predetermined hysteresis low level and a predetermined hysteresis high level; and a bleeder circuit, which is coupled to the hysteresis control circuit, and configured to operably generate a bleeding current according to the bleeder signal; wherein the hysteresis control circuit operates in a cut-off mode when the ACTL signal decreases to the predetermined hysteresis low level, and in the cut-off mode, the hysteresis control circuit adjusts the bleeder signal to maintain the bleeding current at a predetermined bleeding level, so as to maintain an output current of the output signal at zero current, for keeping the light emitting device circuit OFF; wherein the hysteresis control circuit operates in a dimming mode when the ACTL signal increases to the predetermined hysteresis high level, and in the dimming mode, the hysteresis control circuit adjusts the bleeder signal to maintain the bleeding current at zero current, such that the brightness of the light emitting device circuit is adaptively adjusted according to the rectified dimmer signal.

In one preferable embodiment, when the ACTL signal decreases to the predetermined hysteresis low level in the dimming mode, the corresponding output current is at a low boundary level, and the predetermined bleeding level is higher than the low boundary level.

In one preferable embodiment, the predetermined hysteresis low level is not higher than the predetermined hysteresis high level.

In one preferable embodiment, the hysteresis control circuit includes: a multiplexer (MUX), which is configured to operably select the predetermined hysteresis low level or the predetermined hysteresis high level as an MUX output signal of the MUX according to the bleeder signal; and a second comparison circuit, which is coupled to the first comparison circuit, and configured to operably compare the ACTL signal with the MUX output signal to generate the bleeder signal.

In one preferable embodiment, the hysteresis control circuit includes: a second comparison circuit, which is coupled to the first comparison circuit, and configured to operably compare the ACTL signal with the predetermined hysteresis low level, to generate a cut-off control signal; a third comparison circuit, which is coupled to the first comparison circuit, and configured to operably compare the ACTL signal with the predetermined hysteresis high level, to generate a dimmer control signal; an AND logic gate, which is coupled to the second comparison circuit and the third comparison circuit, and configured to operably perform AND logic operation between the cut-off control signal and the dimmer control signal, to generate a setting signal; a NOR logic gate, which is coupled to the second comparison circuit and the third comparison circuit, and configured to operably perform NOR logic operation between the cut-off control signal and the dimmer control signal, to generate a resetting signal; and a flip-flop circuit, which is coupled to the AND logic gate and the NOR logic gate, and configured to operably generate the bleeder signal according to the setting signal and the resetting signal.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 2A:
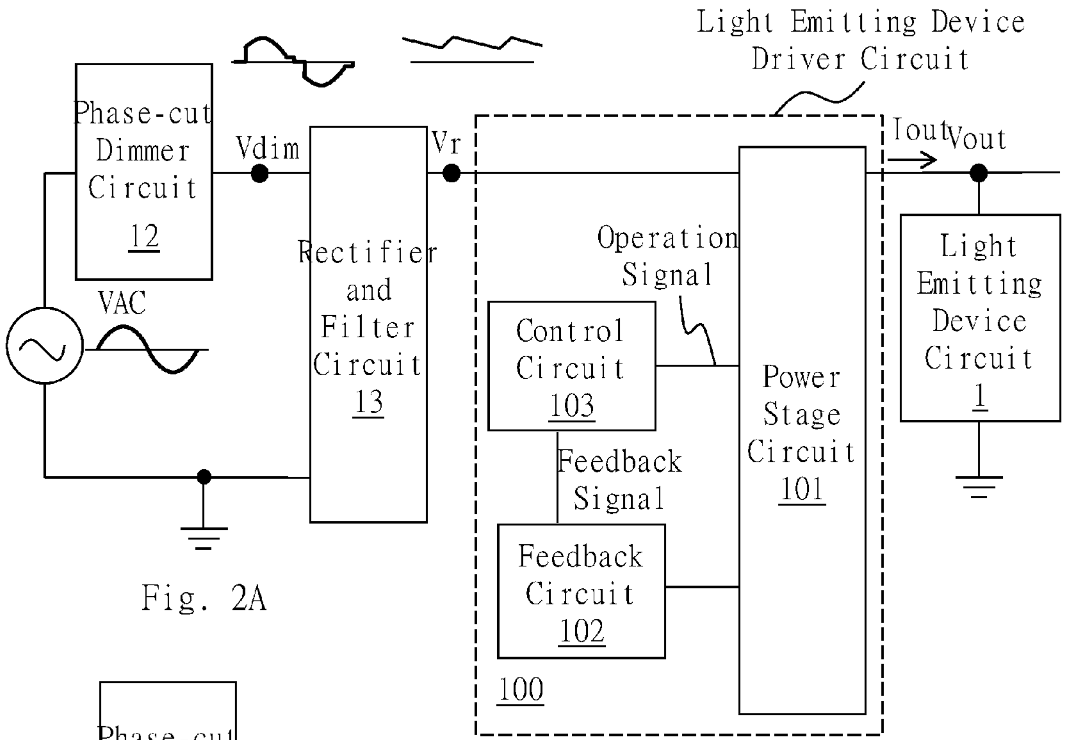
FIGS. 2A-2E show a first embodiment of the present invention.

FIGS. 2A-2E show a first embodiment of the present invention. As shown in FIG. 2A, a phase-cut dimmer circuit receives an AC voltage VAC (as indicated by a small sinusoidal signal waveform in the figure). The phase-cut dimmer circuit 12 phase-cuts the AC voltage VAC to generate an AC dimmer voltage Vdim. More specifically, when a phase of the AC voltage VAC exceeds a predetermined trigger phase, the phase-cut dimmer circuit 12 fires (i.e., is turned ON) to generate the AC dimmer voltage Vdim (as indicated by a small phase-cut sinusoidal signal waveform in the figure). In another embodiment, when the AC voltage VAC exceeds a predetermined trigger phase, the phase-cut dimmer circuit 12 is OFF, and in this case the AC dimmer voltage Vdim is a complementary signal (not shown) of the phase-cut sinusoidal signal shown in the figure, which is well known by those skilled in the art, so details thereof are omitted here. The rectifier and filter circuit 13 rectifies and filters the AC dimmer voltage Vdim to generate a rectified dimmer signal, which includes a rectified dimmer voltage Vr (as indicated by a small DC signal waveform with ripples in the figure) and a rectified dimmer current Ir (shown in FIG. 2B). The light emitting device driver circuit 100 is coupled to the rectifier and filter circuit 13, for converting the rectified dimmer voltage Vr to an output voltage Vout, and providing an output current Tout to a light emitting device circuit 1. In the aforementioned circuit, the function of the phase-cut dimmer circuit 12 is to determine a trigger phase of the AC dimmer voltage Vdim, for adjusting an average brightness of the light emitting device circuit 1. The light emitting device driver circuit 100 is for driving the light emitting device circuit 1 according to the rectified dimmer signal. The phase-cut dimmer circuit 12 converts the AC signal which includes the AC voltage VAC to the AC dimmer signal which includes the AC dimmer voltage Vdim. The phase-cut dimmer circuit 12 for example can be, but is not limited to the TRIAC dimming circuit 11. The phase-cut dimmer circuit 12 blocks the AC signal in an OFF phase period, and retains the AC signal in an ON phase period, i.e. phase-cuts the AC signal, to thereby generate the AC dimmer signal. The rectifier and filter circuit 13 converts the AC dimmer signal to the rectified dimmer signal. The rectifier and filter circuit 13 includes for example but not limited to a bridge rectifier circuit, and can optionally further include a low-pass filter (LPF) circuit and a power factor correction (PFC) circuit, as well known by those skilled in the art, so details thereof are omitted here.

The light emitting device driver circuit 100 includes a power stage circuit 101, a feedback circuit 102, and a control circuit 103. The power stage circuit 101 is coupled to the rectifier and filter circuit 13, for operating at least one power switch therein to convert the rectified dimmer signal to an output signal according to an operation signal, wherein the output signal is for driving the light emitting device circuit 1, wherein the output signal includes an output voltage Vout and an output current Tout. The power stage circuit 101 may be a synchronous or asynchronous buck, boost, inverting, buck-boost, inverting-boost, or flyback power stage circuit as shown in FIGS. 6A-6K. The control circuit 103 is for generating the operation signal according to a feedback signal. The feedback circuit 102 is coupled to the power stage circuit 101, for generating the feedback signal according to the rectified dimmer signal and the output signal.

Figure 2B:
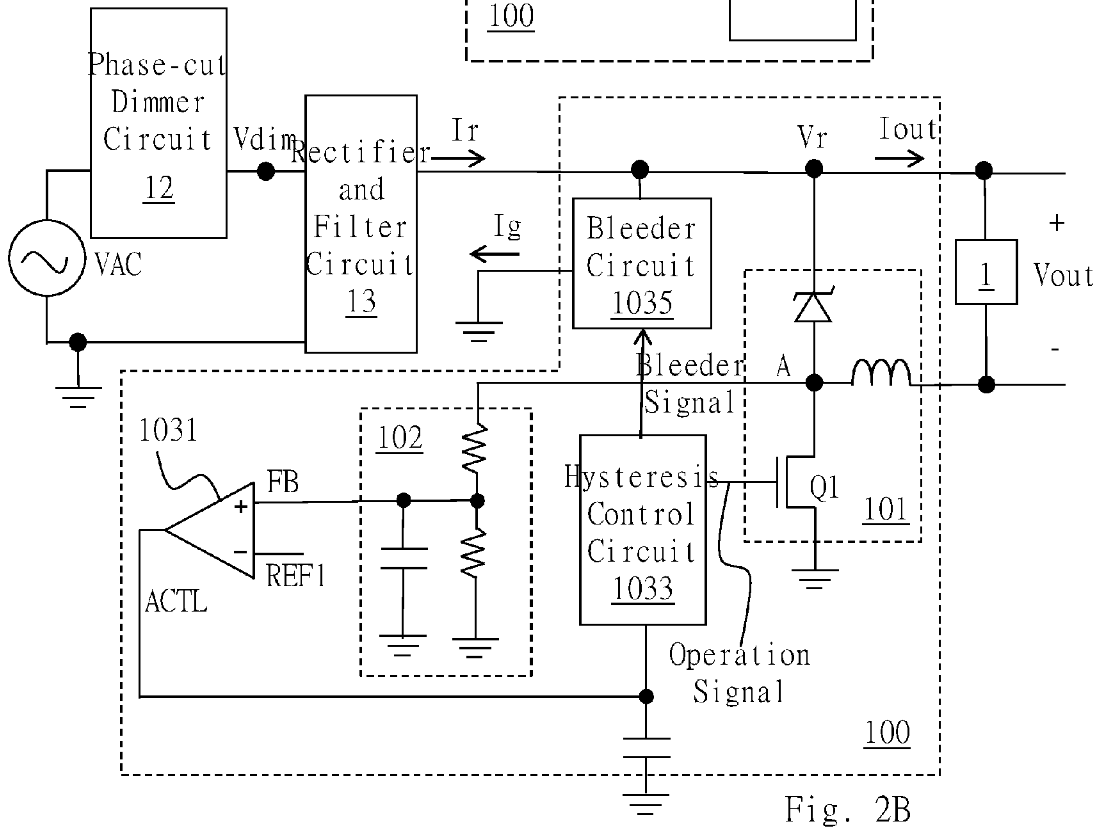

FIG. 2B shows a more specific embodiment of the light emitting device driver circuit 100 in the first embodiment. As shown in FIG. 2B, the power stage circuit 101 is for example but not limited to a buck power stage circuit. The power stage circuit 101 controls a power switch Q1 according to the operation signal to convert the rectified dimmer signal to the output signal for driving the light emitting device circuit 1. The feedback circuit 102 is for example but not limited to a voltage division circuit which includes resistors connected in series and a capacitor shown in the figure. The feedback circuit 102 generates a feedback signal FB according to a voltage at a node A, wherein the voltage at the node A is for example but not limited to a voltage proportional to the rectified dimmer voltage Vr minus the output voltage Vout. The control circuit 103 includes: a comparison circuit 1031, a hysteresis control circuit 1033, and a bleeder circuit 1035. The comparison circuit 1031 is for example but not limited to an operational amplifier as shown in the figure. The comparison circuit 1031 is coupled to the feedback circuit 102, for comparing the feedback signal FB with a reference signal REF1, to generate an analog control signal ACTL. The hysteresis control circuit 1033 is coupled to the comparison circuit 1031, for generating the bleeder signal and the operation signal according to the analog control signal ACTL, a predetermined hysteresis low level ACTLH and a predetermined hysteresis high level ACTLL, which will be explained in more detail later. The bleeder circuit 1035 is coupled to the hysteresis control circuit 1033 and the power stage circuit 101, for generating a bleeding current Ig according to the bleeder signal. The hysteresis control circuit 1033 operates in a cut-off mode when the analog control signal ACTL decreases to the predetermined hysteresis low level, and in the cut-off mode, the hysteresis control circuit 1033 adjusts the bleeder signal to maintain the bleeding current Ig at a predetermined bleeding level, so as to maintain the output current Iout of the output signal at zero current, for keeping the light emitting device circuit 1 in the OFF status. The hysteresis control circuit 1033 operates in a dimming mode when the analog signal ACTL increases to the predetermined hysteresis high level, and in the dimming mode, the hysteresis control circuit 1033 adjusts the bleeder signal to maintain the bleeding current Ig at zero current, such that the brightness of the light emitting device circuit 1 is adaptively adjusted according to the rectified dimmer signal. Note that the predetermined hysteresis low level is preferably not higher than the predetermined hysteresis high level.

Figure 1A:
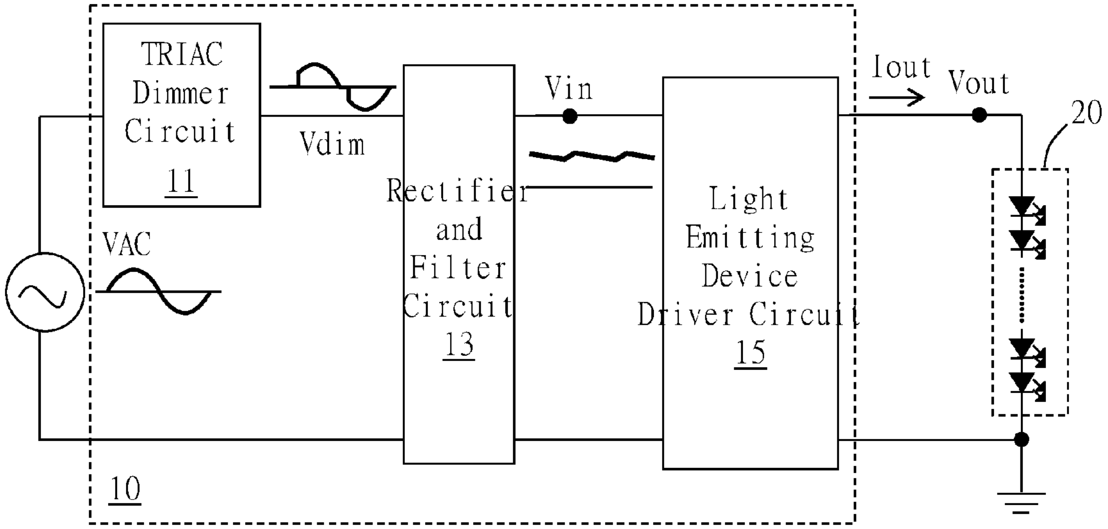
Fig. 1A (Prior Art)
FIG. 1A shows a schematic diagram of a conventional light emitting device power supply circuit 10.
Figure 1B:
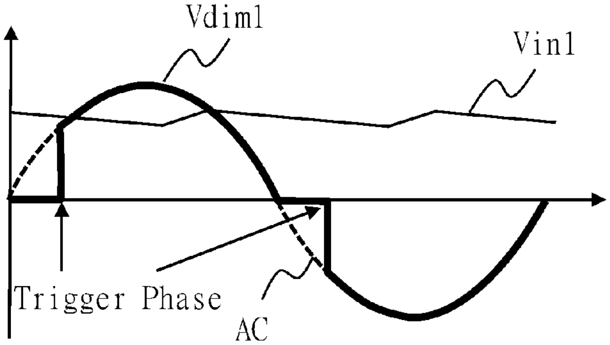
Fig. 1B (Prior Art)
FIGS. 1B and 1C show schematic signal waveforms of the AC voltage, different AC dimmer voltages, and corresponding input voltages.
Figure 1C:
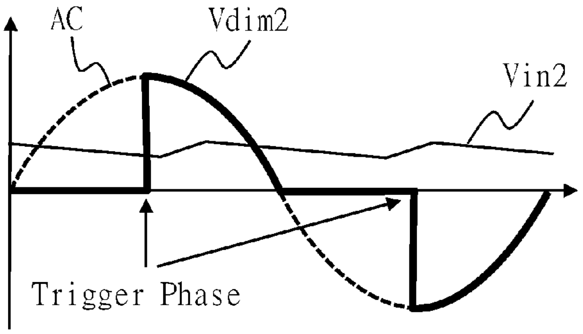
Fig. 1C (Prior Art)
Figure 2C:
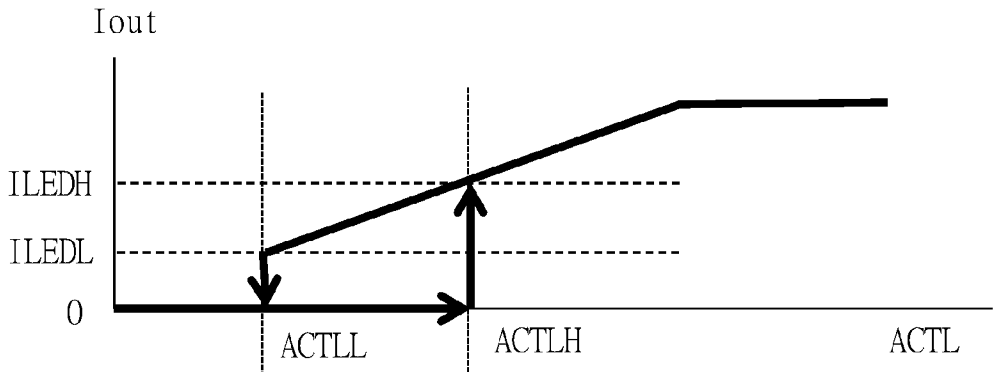
Figure 2D:
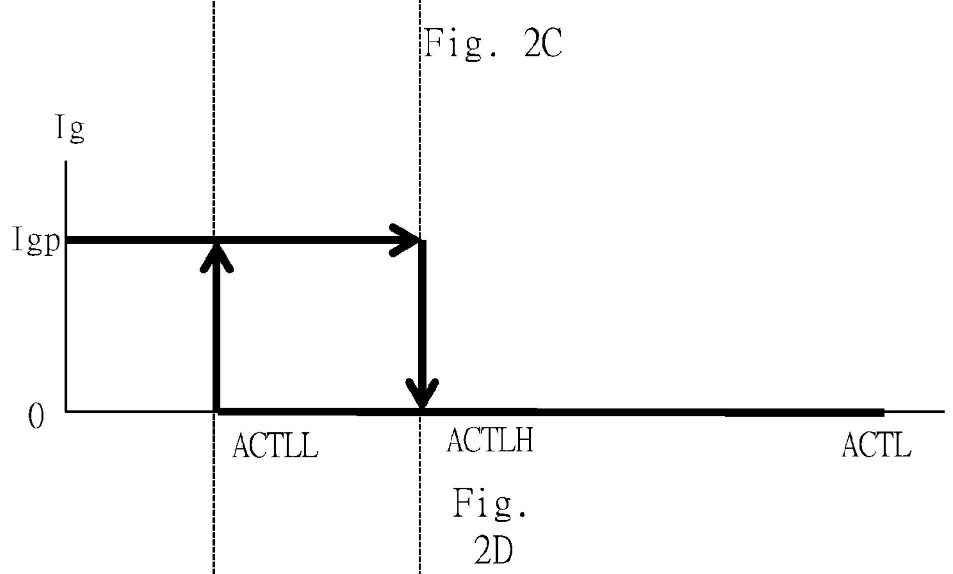
Figure 2E:
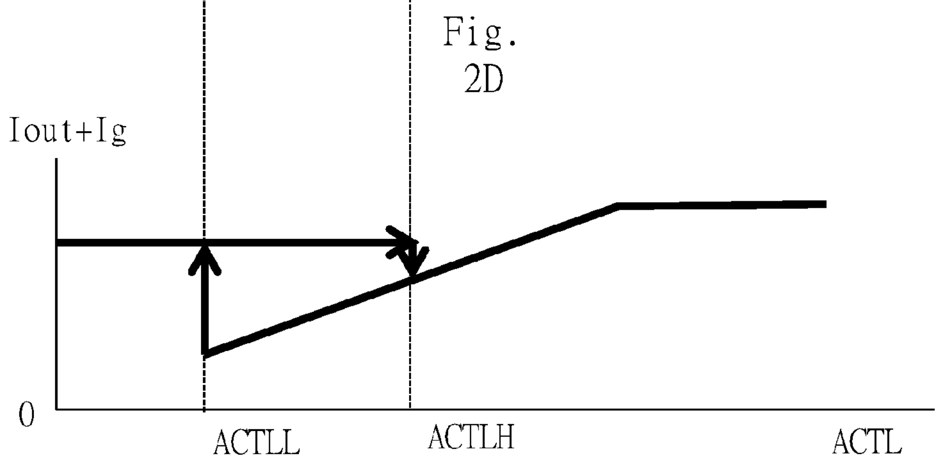

FIGS. 2C-2E show schematic diagrams of characteristics of the analog control signal ACTL, the output current Iout and the bleeding current Ig according to the present invention. As shown in FIG. 2C, according to the present invention, the hysteresis control circuit 1033 operates in a cut-off mode when the analog control signal ACTL decreases to the predetermined hysteresis low level ACTLL, and in the cut-off mode, the hysteresis control circuit 1033 adjusts the bleeder signal such that the bleeding current Ig is changed to and maintained at a predetermined level Igp (i.e. predetermined bleeding level Igp) as shown in FIG. 2D, whereby the output current Iout of the output signal is maintained at zero current, for keeping the light emitting device circuit 1 in the OFF status. The present invention is different from the prior art in that, in the prior art shown in FIG. 1A, when the TRIAC dimmer circuit 11 turns OFF the LED circuit 20, because of the leakage of the TRIAC dimmer circuit 11, the accumulated charges cause the output voltage Vout to increase and generate an output current Iout of decades to hundreds μA (in normal operation, the output current is around a few mA to a few A when the LED circuit 20 is ON), and after the discharge, the output voltage Vout drops and accumulate charges again, so the LED circuit 20 flickers. On the other hand, according to the present invention, when the analog control signal ACTL decreases to the predetermined hysteresis low level ACTLL, the bleeder circuit 1035 generates the predetermined bleeding level Igp, wherein the predetermined bleeding level Igp is higher than a low boundary level ILEDL of the output current Iout, such that the light emitting device circuit 1 is maintained OFF. More specifically, when the analog control signal ACTL decreases to the predetermined hysteresis low level ACTLL in the dimming mode, the corresponding level of the output current Iout is the low boundary level ILEDL, and the predetermined bleeding level is higher than this low boundary level ILEDL, so the rectified dimmer current Ir is completely consumed by the bleeder circuit 1035 and there is no current flowing through the LED circuit 20. Therefore, as shown in FIG. 2D, the output current Tout is maintained at zero current, such that the light emitting device circuit 1 is kept in the OFF status to eliminate the flicker problem in the prior art.

The hysteresis control circuit 1033 operates in a dimming mode when the analog signal ACTL increases to the predetermined hysteresis high level ACTLH, and in the dimming mode, the hysteresis control circuit 1033 adjusts the bleeder signal to change the bleeding current Ig from the predetermined bleeding level Igp to zero current as shown in FIG. 2D, and in the dimming mode, the output current Tout is not lower than the high boundary level ILEDH. More specifically, when the analog control signal ACTL increases to the predetermined hysteresis high level ACTLH in the dimming mode, the corresponding level of the output current Tout is the high boundary level ILEDH. The brightness of the light emitting device circuit 1 is adaptively adjusted according to the rectified dimmer signal (including the rectified dimmer voltage Vr and the rectified dimmer current Ir) in the dimming mode. FIG. 2E shows a schematic diagram of the characteristics of the analog control signal ACTL and a summation of the output current Iout and the bleeding current Ig, to better illustrate the relationships between the output current Tout, the bleeding current Ig, and the summation of the output current Tout and the bleeding current Ig in the cut-off mode and the dimming mode according to the present invention.

Figure 3:
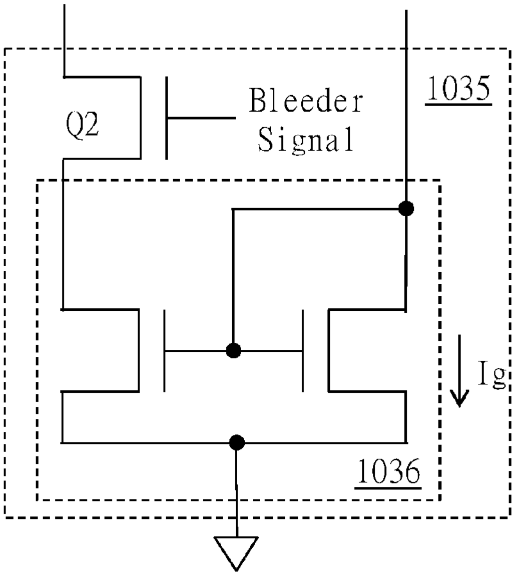
FIG. 3 shows a second embodiment of the present invention.

FIG. 3 shows a second embodiment of the present invention. This embodiment shows a more specific embodiment of the bleeder circuit 1035. As shown in FIG. 3, the bleeder circuit 1035 includes a switch Q2 and a current mirror circuit 1036. The switch Q2 receives the bleeder signal to determine the bleeding current Ig. For example, when the bleeder signal is at a high level, the bleeding current Ig is at the predetermined bleeding level Igp, and when the bleeder signal is at a low level, the bleeding current is set to zero current.

Figure 4:
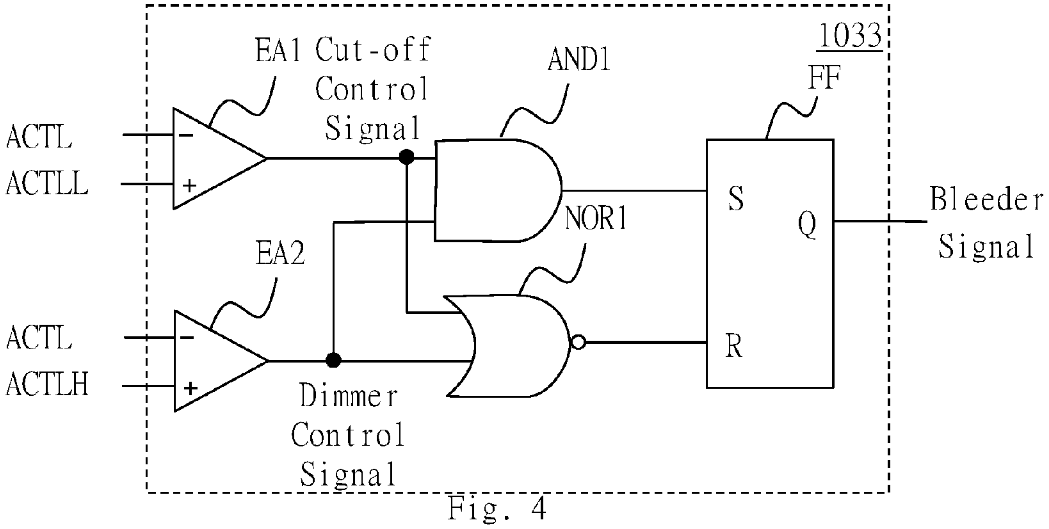
FIG. 4 shows a third embodiment of the present invention.

FIG. 4 shows a third embodiment of the present invention. This embodiment shows a more specific embodiment of the hysteresis control circuit 1033. As shown in FIG. 4, the hysteresis control circuit 1033 includes: a comparison circuit EA1, a comparison circuit EA2, an AND logic gate AND1, a NOR logic gate NOR1, and a flip-flop circuit FF. The comparison circuit EA1 is coupled to the comparison circuit 1031, for comparing the ACTL signal with the predetermined hysteresis low level ACTLL, to generate a cut-off control signal. The comparison circuit EA2 is coupled to the comparison circuit 1031, for comparing the ACTL signal with the predetermined hysteresis high level ACTLH, to generate a dimmer control signal. The AND logic gate AND1 is coupled to the comparison circuit EA1 and the comparison circuit EA2, for performing AND logic operation between the cut-off control signal and the dimmer control signal, to generate a setting signal S. The NOR logic gate NOR1 is coupled to the comparison circuit EA1 and the comparison circuit EA2, for performing NOR logic operation between the cut-off control signal and the dimmer control signal, to generate a resetting signal R. The flip-flop circuit FF is coupled to the AND logic gate AND1 and the NOR logic gate NOR1, for generating the bleeder signal according to the setting signal S and the resetting signal R.

Figure 5:
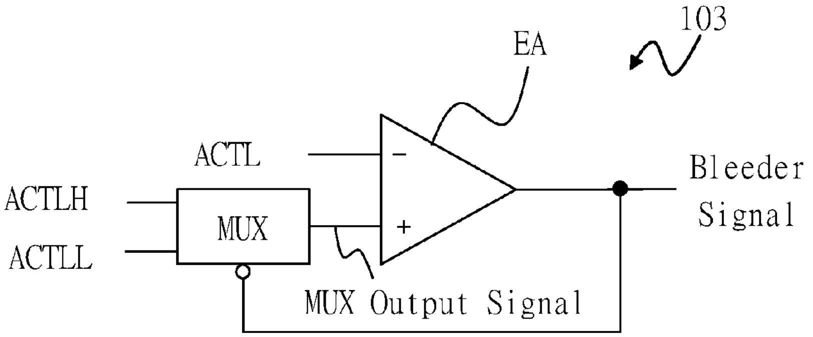
FIG. 5 shows a fourth embodiment of the present invention.
Figure 6A:
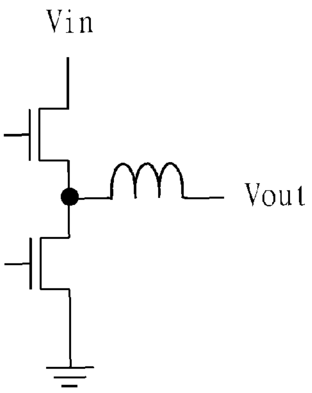
FIGS. 6A-6K show synchronous and asynchronous buck, boost, inverting, buck-boost, inverting-boost, and flyback power stage circuits.
Figure 6B:
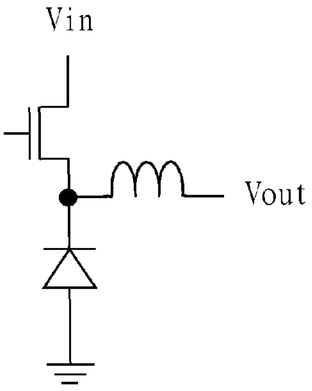
Figure 6C:
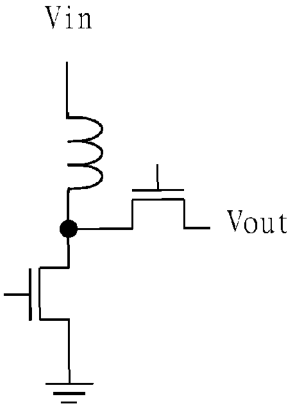
Figure 6D:
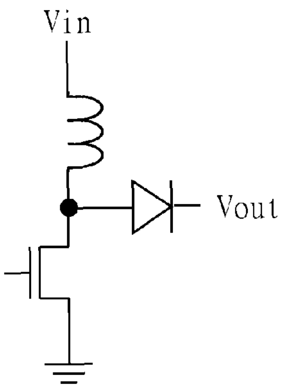
Figure 6E:
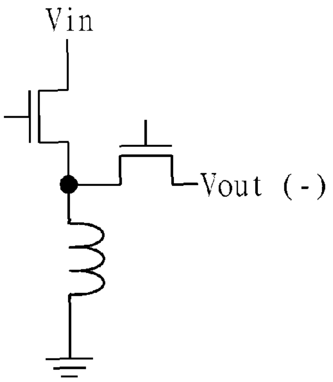
Figure 6F:
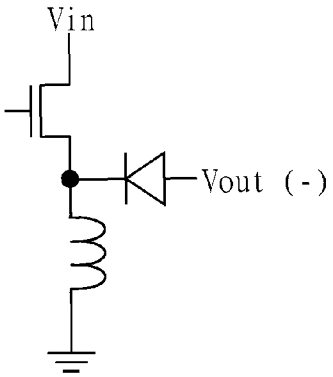
Figure 6G:
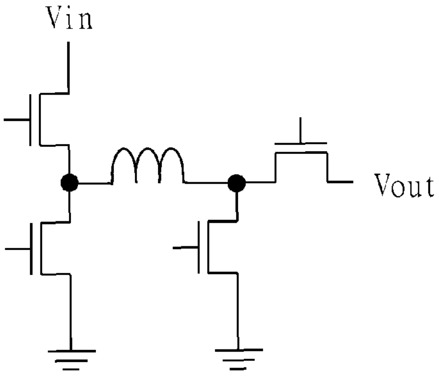
Figure 6H:
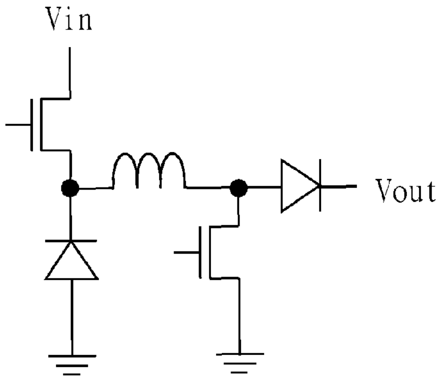
Figure 6I:
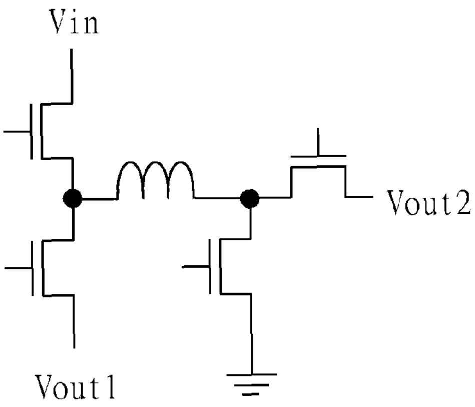
Figure 6J:
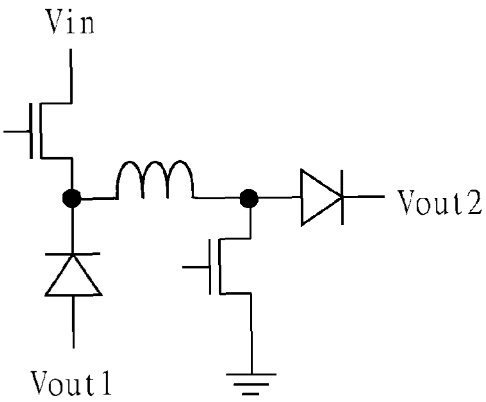
Figure 6K:
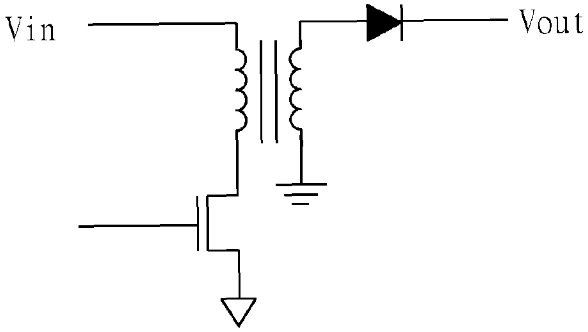

FIG. 5 shows a fourth embodiment of the present invention. This embodiment shows another more specific embodiment of the hysteresis control circuit 1033. As shown in FIG. 5, the hysteresis control circuit 1033 includes: a multiplexer MUX and a comparison circuit EA. The multiplexer MUX selects the predetermined hysteresis low level ACTLL or the predetermined hysteresis high level ACTLH as an MUX output signal of the multiplexer MUX according to the bleeder signal. For example, when the bleeder signal is at the high level, the multiplexer MUX selects the predetermined hysteresis high level ACTLH as an MUX output signal of the multiplexer MUX to be compared with the analog control signal ACTL, and the multiplexer MUX keeps selecting the predetermined hysteresis high level ACTLH as an MUX output signal of the multiplexer MUX when the analog control signal ACTL is lower than the predetermined hysteresis high level ACTLH. On the other hand, when the analog control signal ACTL is higher than the predetermined hysteresis high level ACTLH, the multiplexer MUX selects the predetermined hysteresis low level ACTLL as the MUX output signal of the multiplexer MUX, and the bleeder signal changes from the high level to the low level, whereby the bleeding current Ig changes from the predetermined bleeding level Igp to zero current.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between two devices shown in direction connection in the shown embodiments, such as a switch or the like, so the term "couple" should include direct and indirect connections. For another example, the light emitting device that is applicable to the present invention is not limited to the LED as shown and described in the embodiments above, but may be any light emitting device with a forward terminal and a reverse terminal. For another example, the power converter circuit is not limited to the buck or boost power stage circuit, but may be synchronous and asynchronous buck, boost, and inverting power stage circuits as shown in FIGS. 6A-6K, with corresponding amendments of the circuits or the meanings of the signals. For another example, inverted and non-inverted input terminals of the error amplifier circuit and the comparitor circuit are interchangeable, with corresponding amendments of the circuits processing these signals. For another example, when an external signal of the control circuit (for example but not limited to the feedback signal) is received by the control circuit, and is processed inside the control circuit, a voltage-to-current conversion, a current-to-voltage conversion, and/or a ratio conversion, etc. may be performed during receiving or processing this signal, and therefore, to perform an action "according to" a certain signal is not limited to performing an action strictly according to the signal itself, but can be performing an action according to a converted form or a scaled-up or down form of the signal. For another example, it is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For example, the bleeder circuit 1035 in FIG. 3 can be used in other embodiments. In view of the foregoing, the spirit of the present invention should cover all such and other modifications and variations, which should be interpreted to fall within the scope of the following claims and their equivalents.

What is claimed is:

1. A light emitting device driver circuit, which is configured to operably drive a light emitting device circuit according to a rectified dimmer signal, and determine a brightness of the light emitting device circuit, the light emitting device driver circuit comprising:

a power stage circuit, which is configured to operably control at least one power switch therein to convert the rectified dimmer signal to an output signal according to an operation signal, wherein the output signal is for driving the light emitting device circuit;

a feedback circuit, which is coupled to the power stage circuit, and configured to operably generate a feedback signal according to the rectified dimmer signal and the output signal; and a control circuit, which is coupled to the feedback circuit and the power stage circuit, and configured to operably generate the operation signal according to the feedback signal, wherein the control circuit includes:

a first comparison circuit, which is coupled to the feedback circuit, and configured to operably generate an analog control (ACTL) signal according to the feedback signal;

a hysteresis control circuit, which is coupled to the first comparison circuit, and configured to operably generate a bleeder signal and the operation signal according to the ACTL signal, a predetermined hysteresis low level and a predetermined hysteresis high level; and a bleeder circuit, which is coupled to the hysteresis control circuit, and configured to operably generate a bleeding current according to the bleeder signal;

wherein the hysteresis control circuit operates in a cut-off mode when the ACTL signal decreases to the predetermined hysteresis low level, and in the cut-off mode, the hysteresis control circuit adjusts the bleeder signal to maintain the bleeding current at a predetermined bleeding level, so as to maintain an output current of the output signal at zero current, for keeping the light emitting device circuit OFF;

wherein the hysteresis control circuit operates in a dimming mode when the ACTL signal increases to the predetermined hysteresis high level, and in the dimming mode, the hysteresis control circuit adjusts the bleeder signal to maintain the bleeding current at zero current, such that the brightness of the light emitting device circuit is adaptively adjusted according to the rectified dimmer signal.

2. The light emitting device driver circuit of claim 1, wherein when the ACTL signal decreases to the predetermined hysteresis low level in the dimming mode, the corresponding output current is at a low boundary level, and the predetermined bleeding level is higher than the low boundary level.

3. The light emitting device driver circuit of claim 1, wherein the rectified dimmer signal is generated by a rectifier and filter circuit which converts an AC dimmer signal to the rectified dimmer signal, and the AC dimmer signal is generated by phase-cutting an AC signal by a phase-cut dimmer circuit.

4. The light emitting device driver circuit of claim 1, wherein the predetermined hysteresis low level is not higher than the predetermined hysteresis high level.

5. The light emitting device driver circuit of claim 1, wherein the hysteresis control circuit includes:

a multiplexer (MUX), which is configured to operably select the predetermined hysteresis low level or the predetermined hysteresis high level as an MUX output signal of the MUX according to the bleeder signal; and a second comparison circuit, which is coupled to the first comparison circuit, and configured to operably compare the ACTL signal with the MUX output signal to generate the bleeder signal.

6. The light emitting device driver circuit of claim 1, wherein the hysteresis control circuit includes:

a second comparison circuit, which is coupled to the first comparison circuit, and configured to operably compare the ACTL signal with the predetermined hysteresis low level, to generate a cut-off control signal;

a third comparison circuit, which is coupled to the first comparison circuit, and configured to operably compare the ACTL signal with the predetermined hysteresis high level, to generate a dimmer control signal;

an AND logic gate, which is coupled to the second comparison circuit and the third comparison circuit, and configured to operably perform AND logic operation between the cut-off control signal and the dimmer control signal, to generate a setting signal;

a NOR logic gate, which is coupled to the second comparison circuit and the third comparison circuit, and configured to operably perform NOR logic operation between the cut-off control signal and the dimmer control signal, to generate a resetting signal; and a flip-flop circuit, which is coupled to the AND logic gate and the NOR logic gate, and configured to operably generate the bleeder signal according to the setting signal and the resetting signal.

7. A control method of a light emitting device driver circuit, comprising:

operating at least one power switch in the light emitting device driver circuit to convert a rectified dimmer signal to an output signal according to an operation signal, wherein the output signal is for driving a light emitting device circuit and determining a brightness of the light emitting device circuit;

generating a feedback signal according to the rectified dimmer signal and the output signal;

generating an analog control (ACTL) signal according to the feedback signal;

operating the light emitting device driver circuit in a cut-off mode when the ACTL signal decreases to the predetermined hysteresis low level, and adjusting a bleeder signal to maintain a bleeding current at a predetermined bleeding level, so as to maintain an output current of the output signal at a zero current for keeping the light emitting device circuit OFF; and operating the light emitting device driver circuit in a dimming mode when the ACTL signal increases to the predetermined hysteresis high level, and adjusting the bleeder signal to maintain the bleeding current at the zero current, so as to adaptively adjust the brightness of the light emitting device circuit according to the rectified dimmer signal.

8. The light emitting device driver circuit of claim 7, wherein when the ACTL signal decreases to the predetermined hysteresis low level in the dimming mode, the corresponding output current is at a low boundary level, and the predetermined bleeding level is higher than the low boundary level.

9. The light emitting device driver circuit of claim 7, wherein the rectified dimmer signal is generated by a rectifier and filter circuit which converts an AC dimmer signal to the rectified dimmer signal, and the AC dimmer signal is generated by phase-cutting an AC signal by a phase-cut dimmer circuit.

10. The light emitting device driver circuit of claim 7, wherein the predetermined hysteresis low level is not higher than the predetermined hysteresis high level.

11. A control circuit of a light emitting device driver circuit, wherein the light emitting device driver circuit drives a light emitting device circuit according to a rectified dimmer signal to determine a brightness of the light emitting device circuit, wherein a phase-cut dimmer circuit phase-cuts an AC signal to generate an AC dimmer signal, and a rectifier and filter circuit converts the AC dimmer signal to the rectified dimmer signal, wherein the light emitting device driver circuit includes a power stage circuit, a feedback circuit, and the control circuit, wherein the power stage circuit is coupled to the rectifier and filter circuit, for operating at least one power switch therein to convert the rectified dimmer signal to an output signal according to an operation signal, wherein the output signal is for driving the light emitting device circuit, wherein the feedback circuit is coupled to the power stage circuit for generating a feedback signal according to the rectified dimmer signal and the output signal, wherein the control circuit is coupled to the feedback circuit and the power stage circuit, and configured to operably generate the operation signal according to the feedback signal, the control circuit comprising:

a first comparison circuit, which is coupled to the feedback circuit, and configured to operably generate an analog control (ACTL) signal according to the feedback signal;

a hysteresis control circuit, which is coupled to the first comparison circuit, and configured to operably generate a bleeder signal and the operation signal according to the ACTL signal, a predetermined hysteresis low level and a predetermined hysteresis high level; and a bleeder circuit, which is coupled to the hysteresis control circuit, and configured to operably generate a bleeding current according to the bleeder signal;

wherein the hysteresis control circuit operates in a cut-off mode when the ACTL signal decreases to the predetermined hysteresis low level, and in the cut-off mode, the hysteresis control circuit adjusts the bleeder signal to maintain the bleeding current at a predetermined bleeding level, so as to maintain an output current of the output signal at zero current, for keeping the light emitting device circuit OFF;

wherein the hysteresis control circuit operates in a dimming mode when the ACTL signal increases to the predetermined hysteresis high level, and in the dimming mode, the hysteresis control circuit adjusts the bleeder signal to maintain the bleeding current at zero current, such that the brightness of the light emitting device circuit is adaptively adjusted according to the rectified dimmer signal.

12. The control circuit of claim 11, wherein when the ACTL signal decreases to the predetermined hysteresis low level in the dimming mode, the corresponding output current is at a low boundary level, and the predetermined bleeding level is higher than the low boundary level.

13. The control circuit of claim 11, wherein the predetermined hysteresis low level is not higher than the predetermined hysteresis high level.

14. The control circuit of claim 11, wherein the hysteresis control circuit includes:

a multiplexer (MUX), which is configured to operably select the predetermined hysteresis low level or the predetermined hysteresis high level as an MUX output signal of the MUX according to the bleeder signal; and a second comparison circuit, which is coupled to the first comparison circuit, and configured to operably compare the ACTL signal with the MUX output signal to generate the bleeder signal.

15. The control circuit of claim 11, wherein the hysteresis control circuit includes:

a second comparison circuit, which is coupled to the first comparison circuit, and configured to operably compare the ACTL signal with the predetermined hysteresis low level, to generate a cut-off control signal;

a third comparison circuit, which is coupled to the first comparison circuit, and configured to operably compare the ACTL signal with the predetermined hysteresis high level, to generate a dimmer control signal;

an AND logic gate, which is coupled to the second comparison circuit and the third comparison circuit, and configured to operably perform AND logic operation between the cut-off control signal and the dimmer control signal, to generate a setting signal;

a NOR logic gate, which is coupled to the second comparison circuit and the third comparison circuit, and configured to operably perform NOR logic operation between the cut-off control signal and the dimmer control signal, to generate a resetting signal; and a flip-flop circuit, which is coupled to the AND logic gate and the NOR logic gate, and configured to operably generate the bleeder signal according to the setting signal and the resetting signal.

* * * * *